(12) United States Patent
Turina et al.

(10) Patent No.: US 7,187,934 B2
(45) Date of Patent: Mar. 6, 2007

(54) METHOD AND APPARATUS FOR STEERING IDLE MOBILE STATIONS

(75) Inventors: Dalibor Turina, Täby (SE); Ulrik Wahlberg, Täby (SE); Tomas Hedberg, Stockholm (SE); Stefan Ström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 11/010,565

(22) Filed: Dec. 14, 2004

(65) Prior Publication Data

US 2006/0128394 A1   Jun. 15, 2006

(51) Int. Cl.
*H04Q 7/20* (2006.01)

(52) U.S. Cl. ............... 455/453; 455/434; 455/450; 455/448; 455/435.2; 370/331

(58) Field of Classification Search ............ 455/426.1, 455/432.1, 435.1, 435.2, 435.3, 432.3, 448, 455/453, 454, 552.1, 553.1, 433, 434, 439, 455/422.1; 370/331, 328, 338, 335
See application file for complete search history.

(56) References Cited

U.S. PATENT DOCUMENTS

| | | | | |
|---|---|---|---|---|
| 6,128,490 A | * | 10/2000 | Shaheen et al. | ............ 455/453 |
| 6,167,283 A | * | 12/2000 | Korpela et al. | .......... 455/552.1 |
| 6,266,531 B1 | * | 7/2001 | Zadeh et al. | ............... 455/453 |
| 6,327,472 B1 | * | 12/2001 | Westroos et al. | ........... 455/453 |
| 6,701,149 B1 | * | 3/2004 | Sen et al. | ................. 455/452.2 |
| 2001/0016482 A1 | * | 8/2001 | Bergstrom et al. | .......... 455/332 |
| 2004/0058679 A1 | * | 3/2004 | Dillinger et al. | ............ 455/450 |
| 2004/0192313 A1 | * | 9/2004 | Otting | ........................ 455/450 |
| 2004/0209624 A1 | | 10/2004 | Rune et al. | |
| 2005/0090257 A1 | | 4/2005 | Kroner et al. | |
| 2005/0202828 A1 | * | 9/2005 | Pacen et al. | ................ 455/453 |
| 2006/0111110 A1 | * | 5/2006 | Schwarz et al. | ............. 455/439 |
| 2006/0142032 A1 | * | 6/2006 | Derakhshan et al. | ........ 455/509 |
| 2006/0215609 A1 | * | 9/2006 | Kyung et al. | ................ 370/331 |

FOREIGN PATENT DOCUMENTS

| | | |
|---|---|---|
| GB | 2 364 207 | 1/2002 |
| WO | WO 03/069938 A1 | 8/2003 |
| WO | WO 2004/040935 | 5/2004 |

OTHER PUBLICATIONS

International Search Report and Written Opinion mailed Mar. 27, 2006 in corresponding PCT Application No. PCT/SE2005/001825.

* cited by examiner

*Primary Examiner*—Joseph Feild
*Assistant Examiner*—Kamran Afshar
(74) *Attorney, Agent, or Firm*—Nixon & Vanderhye P.C.

(57) ABSTRACT

Load redistribution and other benefits may be achieved by dynamically distributing or "steering" idle mobile stations to a particular cell or area. For example, idle mobile stations may be steered from a loaded cell to less loaded cells by changing one or more cell broadcast parameters.

18 Claims, 4 Drawing Sheets

METHOD AND APPARATUS FOR STEERING IDLE MOBILE STATIONS

RELATED APPLICATION

This application is related to commonly-assigned, related U.S. patent application Ser. No. 11/010,564, entitled "Method And Apparatus For Steering Idle Mobile Stations," the content of which is incorporated here by reference.

TECHNICAL FIELD

The present invention relates to mobile communications, and more particularly, to steering idle mobile stations to different geographical service areas such as a cell, location area, or routing area.

BACKGROUND AND SUMMARY

Modern mobile stations, sometimes referred to as mobile terminals (MTs) or user equipment (UE), are often capable of connecting to and communicating with two or more different types of radio access networks. One example is a dual-mode mobile terminal capable of connecting to a second generation (2G) radio access network, such as the Global System for Mobile communication (GSM), Digital Advanced Mobile Phone System (D-AMPS), or Pacific Digital Cellular system (PDC), as well as to a third generation (3G) radio access network, such as Universal Mobile Telecommunication System (UMTS) Terrestrial Radio Access Network (UTRAN). Other radio technologies, such as Bluetooth or 802.11, may also be used. An environment that enables access to more than one radio access technology (RAT) is called a multi-access environment.

In GSM/GPRS and WCDMA systems, mobility management is related to the state of the mobile station. In general, when the mobile station is "attached" to a network, it can be in either an idle/ready state in which it is not involved in an active connection, e.g. a communication with another subscriber, or in an connected/active mode in which the mobile terminal is engaged in active connection, e.g., communicating with another subscriber, and receiving service from the network. Although the states of the mobile station may have different labels in different systems, the term "idle" mobile station is used to cover a mobile station in any state in which the mobile station is powered-on but is not actively participating in a communication. During an idle state, the mobile station may select, register with, and "camp on" a cell in order to obtain service when desired by the mobile subscriber or when an incoming call is made to the mobile subscriber. Camping is the mode an idle mobile station adopts after it registers with a cell. Non-limiting examples of a mobile station being in an idle state where it selects the cell to receive service includes an idle state, a ready state, a stand by state, a CELL_FACH state, a CELL_PCH state, and a URA_PCH state.

In the idle state, a mobile station reads system information (all or only part) broadcast by various cells, including the cell in which the mobile terminal is currently located or registered and neighboring cells, to determine whether to select another cell to camp on. When an idle mobile station decides to select another cell to camp on, that process is sometimes referred to as cell re-selection. Once a cell re-selection occurs, the network will receive a location update message from the mobile terminal and update the stored location information, (e.g., cell, location area, routing area, etc.), which may be used to page the mobile station.

Ideally, network operators would prefer to have total flexibility in directing or steering mobile subscribers between networks using different radio access technologies, e.g., to divide the subscribers in different service categories like "gold/silver" subscriptions. This might mean that some mobile stations might camp on a UMTS-based cell while in an idle state as long as there UMTS coverage. In contrast, idle mobile stations of less-preferred subscribers are directed to camp on a GSM/GPRS cell. These less preferred subscribers may still have the possibility to move to a UMTS cell when requesting certain services.

In order to provide satisfactory service to mobile subscribers and to maximize the capacity of a mobile communications network, it is important to balance the overall network load amongst the various cells within that network. It would be desirable to direct or steer mobile terminals from their respective current cells, if the loads in those current cells exceed a particular threshold, to a neighboring or overlapping cell with a lower load. Switching active mobile stations with an active connection between cells requires substantial signaling, particularly when the switch is made from a cell in one radio access technology system to another, e.g., WCDMA to GSM. Moving active subscribers also requires that the connection between the mobile terminal and the network be maintained during the entire time that the inter-system change is taking place in order to ensure that the promised quality of service is maintained for that active connection. This consumes considerable resources in both the core and radio networks.

A better solution for satisfying subscriber preferences and network operator preferences, providing subscription services, and accomplishing network management type functions like load redistribution and others is to dynamically distribute or "steer" idle mobile stations to a particular cell or area. For example, idle mobile stations may be steered to less loaded load monitoring areas, (e.g., like cells, location areas, etc.), in the same or different networks.

In one non-limiting example, mobile stations are distributed between load monitoring areas when they are in a state where the mobile station selects a cell to receive service based on one or more parameters provided by one or both of a first broadcast signal in a cell in a first load monitoring area or a second broadcast signal in a cell in a second load monitoring area. The load associated with the first area where one or more mobile stations are currently camped is determined. To reduce the load for the first area, e.g., the load monitoring area load is too high or otherwise exceeds a threshold, adjustment of one or more parameters in one or both of the broadcast messages is initiated in order to steer some mobile stations to camp on the second load monitoring area (which is preferably less loaded).

The first and second load monitoring may be cells, location areas, routing areas, or service areas. The adjustment may be initiated based upon load information from a core network node, a radio access network node, or from a central server. In a preferred, non-limiting example application, the first load monitoring area is associated with a first mobile communications network that offers a first set of services, and the second load monitoring area is associated with the second mobile communications network that offers a second set of services. Of course, this methodology can be extended to third and additional communications networks, particularly when the subscribed services can be obtained from an additional network.

The first mobile communications network may employ a first radio access technology, and the second mobile communications network may employ a second different radio access technology. For example, the first mobile communications network may be a second generation-based network, and the second communications network may be a third generation-based network. The first and second set of services may be different or the same.

The adjustment instruction may be based on an exchange of load information between a first radio access network node in the first mobile communications network, and a second radio access network node in the second mobile communications network. Alternatively, the adjustment instruction may be based on load information from a core network node, or it can be based on load information from a central server.

As an example implementation of broadcast parameter adjustment, an offset may be applied to a broadcast parameter. An offset parameter may be added to or subtracted from a signal that is measured by the mobile station for a cell selection procedure or a cell re-selection procedure. In order to avoid unnecessary battery drain in idle mobiles, the rate of change at which the broadcast parameters are changed may be controlled.

DETAILED DESCRIPTION

The following description sets forth specific details, such as particular embodiments, procedures, techniques, etc., for purposes of explanation and not limitation. It will be appreciated by one skilled in the art that other embodiments may be employed apart from these specific details. For example, although the following description is facilitated using non-limiting GSM/GPRS/UMTS examples, radio access technologies other than GSM/GPRS/UMTS may be used. In addition, the described principles may be employed in a communications system that employs only one type of radio access technology or in a communications system that incorporates multiple different radio access technologies.

In some instances, detailed descriptions of well-known methods, interfaces, circuits, and signaling are omitted so as not to obscure the description with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific integrated circuitry (ASIC), and/or using one or more digital signal processors (DSPs).

Figure 1:
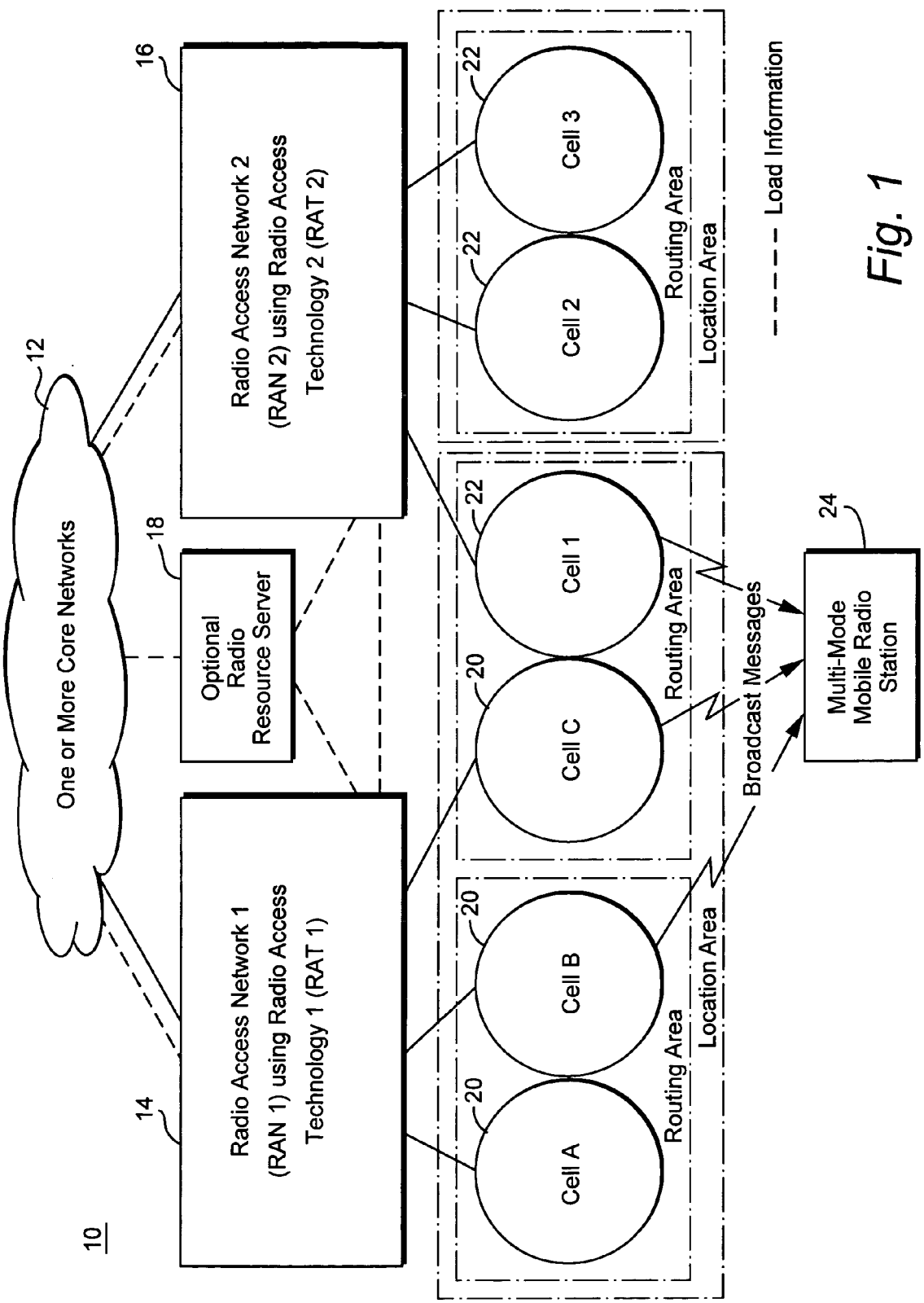
FIG. 1 illustrates a communication system that includes two radio access network using different radio access technologies.

FIG. 1 illustrates a communications system 10 that includes one or more core networks 12 coupled to two radio access networks (RANs) 14 and 16 labeled as RAN 1 and RAN 2. In this example, the radio access network 1 uses radio access technology 1 (RAT 1), and radio access network 2 uses radio access technology 2 (RAT 2). RAT 1 and RAT 2 may correspond to the same or different radio access technologies. RAN 1 supports several cells 20, examples of which are labeled cells A, B, and C. Similarly, radio access network 16 supports several cells 22, examples of which are labeled as cells 1, 2, and 3. Each network may also support routing areas (RAs) which contain one or more cells as well as may contain one or more location areas (LAs) which contain one or more routing areas. UMTS also permits Core Network nodes to monitor load in a service area (SA). Load balancing may be improved using idle mobile station steering at the cell level, location area level, routing level, or any other geographic service/coverage level desired, based on cell broadcast, cell re-selection, mobility management, and other functions existing for the air interface. For ease of reference, any such area is referred to as a load monitoring area.

Each cell generates a broadcast message. For simplicity purposes, a single multi-mode radio station 24 is shown receiving and detecting broadcast messages from cell B, cell C, and cell 1. The multi-mode radio station 24 can communicate with and receive service from either radio access network, even if their respective radio access technologies differ. The multi-mode radio station or terminal 24 is idle, meaning that it is in a state where it is able to select a cell to register with and camp on. For example, the mobile radio station 24 may decide to camp on the cell having the broadcast message with the highest received signal strength. Some other measure of the current radio conditions in the cell may be used.

Because cell load should be factored in cell selection or re-selection, information regarding the load level in (or otherwise associated with) each cell may be determined by one or more of the following: a node or entity in the core network 12, a node or entity in one or both of the radio access networks 14 and 16, and/or an optional centralized radio resource server 18. Load information being communicated between various entities is indicated in FIG. 1 with dashed lines.

Figure 2:
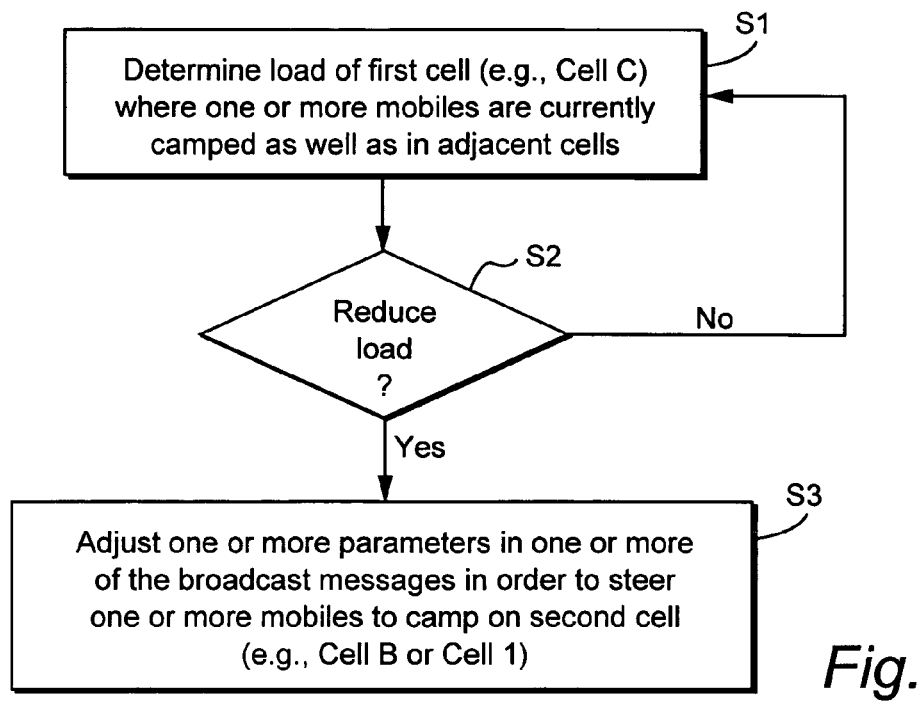
FIG. 2 is a flowchart diagram illustrating steps for reducing the load and in a first cell where a mobile station is currently camped.

Referring to the flowchart in FIG. 2, the current load of the first cell is determined (step S1). Assuming the example of FIG. 1, one or more mobile radio terminals 24 is camped on cell C. Because there are typically many mobile radio terminals in the cell, the mobile terminals are steered generally rather than individually. By changing broadcast parameters in a specific cell, all mobile terminals camping on that particular cell will be affected by that change and will "rank" their possible candidate cells in different ways. Because radio conditions are specific to individual mobiles, those specific conditions will impact whether a broadcast parameter change will trigger the mobile terminal to choose another cell. Hence, broadcast parameter steering can be viewed as a "statistical" steering or a steering of the "average" mobile terminal. The current load in other adjacent cells is also determined. A decision is made whether it is desirable to reduce the load in the first (cell C) (step S2). If not, the load determination process continues. If the load needs to be reduced, steps are taken to adjust one or more parameters in one or more of the broadcast messages in order to steer one or more mobile terminals 24 to camp on a second cell that is hopefully less congested (step S3).

Consider an example scenario from FIG. 1. It may be desirable to maintain the idle mobile station 24 with the same radio access network 14. In that case, it may be appropriate to adjust the broadcast message parameters in order to steer the idle mobile terminal 24 to camp on cell B in RAN 14, assuming cell B is less loaded than cell C or A. Such a cell re-selection may be particularly seamless if all cells in the radio access network 14 can provide the same service. In any event, this intra-network cell re-selection does not require inter-network cell re-selection messaging.

The load determination and broadcast parameter adjustment may be implemented or initiated by any suitable node or entity, including for example: one or more core network nodes, one or more radio access network nodes in one or more radio access networks, the central radio resource server 18 (which is optional, depending on the implementation), etc. The manner in which the broadcast parameter is actually adjusted may be done in any suitable fashion. It may also be desirable to control the frequency or rate of change at which the mobile station may be steered to a new cell in order to avoid unnecessary cell changes and the associated signaling burden. While there may be an exchange of measurements between various entities and nodes, this of course is optional, and the load and parameter adjustment determinations may be performed within one node or entity. The actual adjustment may be performed the base station or node B.

Figure 3:
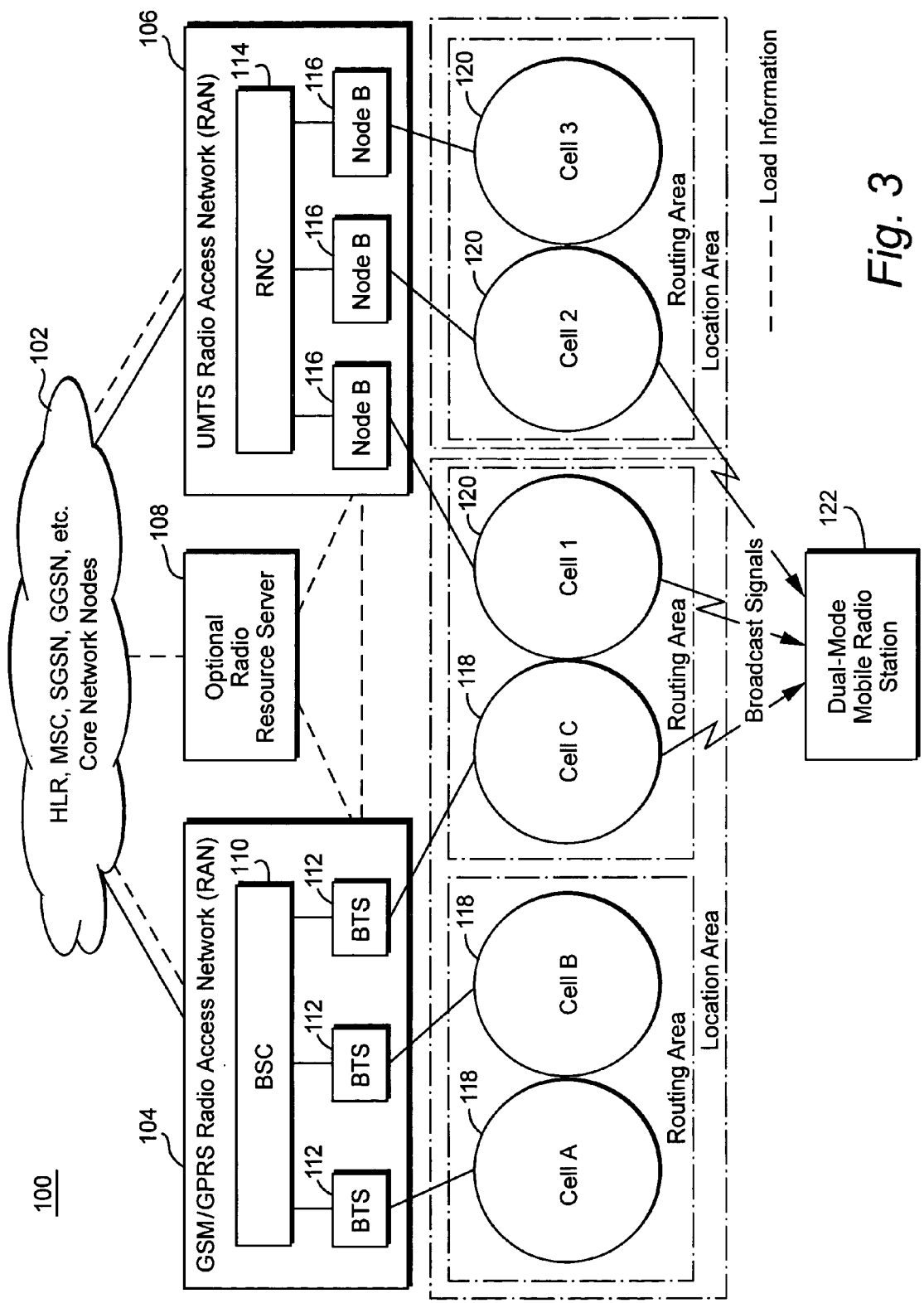
FIG. 3 illustrates another communications system that includes a GSM/GPRS radio access network and a UMTS radio access network.

Reference is now made to another more detailed but still non-limiting example implementation in the context of communication systems 100 illustrated in FIG. 3. In this system 100, there are two different radio access technologies used in two radio access networks. A GSM/GPRS radio access network 104 employs a TDMA type RAT, and a UMTS radio access network 106 employs a CDMA or WCDMA-based RAT. Both radio access networks are coupled to core network nodes 102 associated with these types of radio access networks including a home location register, HLR, a mobile switching center (MSC), a serving GPRS support node (SGSN), and a gateway GPRS support node (GGSN), etc. The GSM/GPRS RAN 104 includes one or more base station controllers (BSCs), but only one BSC 110 is shown for simplicity. BSC 110 is coupled to one or more base stations (BTSs) 112, and each base station 112 is associated with a particular cell 118. Three example cells are shown: A, B, and C. The UMTS radio access network 106 includes one or more radio network controllers (RNCs); only one RNC 114 is shown for simplicity. Each RNC 114 is coupled to one or more node B's 116. Each node B is associated with one or more cells. For simplicity, each of the three node B's shown is associated with only one cell 1, 2, and 3. Each cell generates a broadcast or reception by mobile terminals. FIG. 3 includes a dual mode radio station 122 that can communicate using the RATs of the GSM/GPRS network 104 and the UMTS radio access network 106.

There are many different ways in which the load information for each of the cells 118 and 120 may be determined. For example, an MSC or SGSN in the core network may determine the load information in each location area (LA), routing area (RA), service area (SA), or cell. Regardless of on which "level" load is measured, if current standards only provide broadcast parameters at a cell level to steer idle mobiles, then the load measured on a higher area level is mapped to a cell level within a LA, RA, or SA. The load information is sent to the BSC 110 and/or the RNC 114. Alternatively, an optional central radio resource server 108 may collect load information to determine cell or other area loads. Alternatively, the BSC 110 and/or base stations 112 may determine that information as may the RNC 14 and/or nodes B's 116. Information may be exchanged between networks or communicated to the optional radio resource server 108, if desired. Any appropriate signaling format may be used. For example, in exchanging load information between BSC 110 and RNC 114, the signaling and load "containers" described in the 3GPP 25.413 specification (i.e., in an "Inter-System Information Transparent Container") may be employed. Load calculation in the BNC/RNC may be preferred since load information typically can be calculated by the BSC/RNC and does not require additional signaling or configuration. The broadcast message adjustment(s) may be made by any of these same entities and then communicated for implementation at the corresponding base station or Node B.

Figure 4:
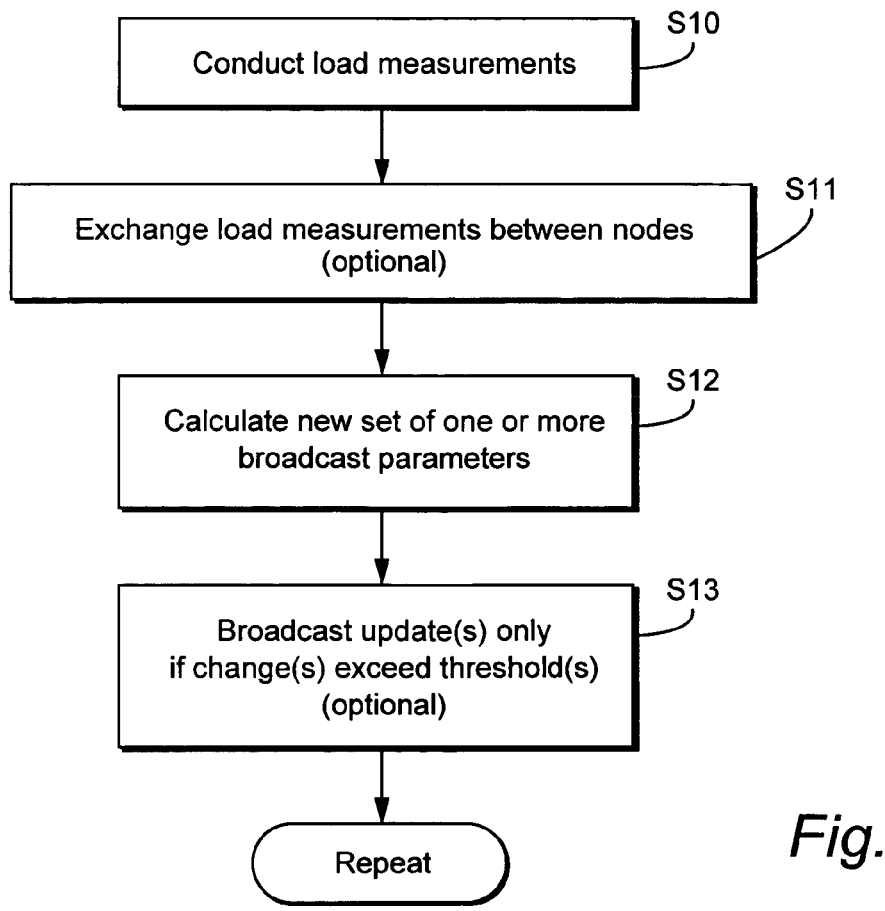
FIG. 4 is a flowchart diagram illustrating example procedures in accordance with one, non-limiting example relating to load distribution.

Reference is now made to the flowchart diagram shown in FIG. 4. In step S10, load measurements are conducted for various ones of the cells 118 and 120, shown in FIG. 3. The load can be viewed in terms of any one or more resources used in those cells. Example resources include bandwidth, power, frequencies, time slots, spreading codes, memory, data processing resources, landline transport bandwidth, etc. Load can be measured in the downlink direction from the cell to the mobile terminal and/or in the uplink direction from the mobile terminal to the cell. Load measurements can be combined. The load can be represented as an absolute or a relative number. Filtering and/or averaging of the load measurements may be employed. The load measurements may be exchanged between nodes or entities within the same network or different networks (step S11), but this information exchange is optional depending on the circumstances. It may be desirable to only exchange load information when the change in load or the accumulated change in load exceeds a particular threshold. In addition, if the mobile terminal can be steered to another cell within the same network, e.g., steer mobile radio station 122 in FIG. 3 from cell 1 to cell 2 which are both in the UMTS radio access network 106, this can avoid inter-network signaling and delays.

One or more broadcast parameters is adjusted for one or more of the cells (step S12). Indeed, a new set of parameter values may be calculated, e.g., a cell offset, based on differences between the loads in adjacent cells. The offsets can be expressed in decibels or linear units. One or more previously determined load samples may be used as an input, and a new parameter value calculated may be used as an adjustment to this previously determined value. Alternatively, a new absolute parameter value could be calculated. Because load values may fluctuate significantly, filtering, averaging, and/or thresholding may be desirable to avoid unnecessary calculations, cell switching, and signaling. Restricting the broadcast parameter update rate to avoid too frequent update of broadcast message information helps to preserve mobile battery life and system stability. The new offset value is broadcasted by serving and/or neighboring cell(s).

Examples parameters that could be adjusted in broadcasted information include: signal strength offsets or quality offsets, which potentially could be combined with timer values if temporary offsets are desired, cell priorities, cell level priorities, Minimum Quality Thresholds, and allowed power levels. Specific non-exclusive examples of existing parameters that could be used in a UMTS cell are Qoffset1(s,n) for signal strength or Qoffset2(s,n) for Ec/No measurements, which may be used in cell ranking. These parameters define the offset between serving (s) and neighbor (n) cells. Each neighbor cell relation can be set individually. Specific, non-exclusive examples for a GSM cell are CELL_RESELECT_OFFSET or GPRS_RESELECT_OFFSET, which are used in the cell selection/cell reselection evaluation, and could potentially be used to off load a GSM cell towards a neighbor cell.

The following are example offset determination equations:

$$\text{Offset}(\text{Source, Neighbor}, T_{n+1}) = \text{Offset}(\text{Source, Neighbor}, T_n) + C \cdot [\text{Load}(\text{Neighbor}, T_n) - \text{Load}(\text{Source}, T_n)] \quad (1)$$

$$\text{Offset}(\text{Source, Neighbor}, T_n+1) = \text{Offset}(\text{Source, Neighbor}, T_n) + \text{Func}[\text{Load}(\text{Neighbor}, T_n) - \text{Load}(\text{Source}, T_n)] \quad (2)$$

$$\text{Offset}(\text{Source, Neighbor}, T_{n+1}) = \text{Const}_0 + \text{Const}_1 \cdot (\text{Load}(\text{Neighbor}, T_n) - \text{Load}(\text{Source}, T_n)] \quad (3)$$

Example offsets include: CRO (Cell_Reselect_Offset), GRO (n) (GPRS_Reselect_Offset), and the UMTS offsets Qoffset1$_{s,n}$ or Qoffset2$_{s,n}$ for signal strength RSCP or signal quality Ec/No. $T_n$ means "at the nth event," and could be periodic or non-periodic, where n is a counter of events when the calculation takes place. Source refers to an identity for a certain cell or area on which the mobile terminal currently camps. Neighbor refers to an identity for a certain cell or area adjacent to the source cell or area. Of course, each source cell is typically a neighbor cell to other cells.

Figure 5:
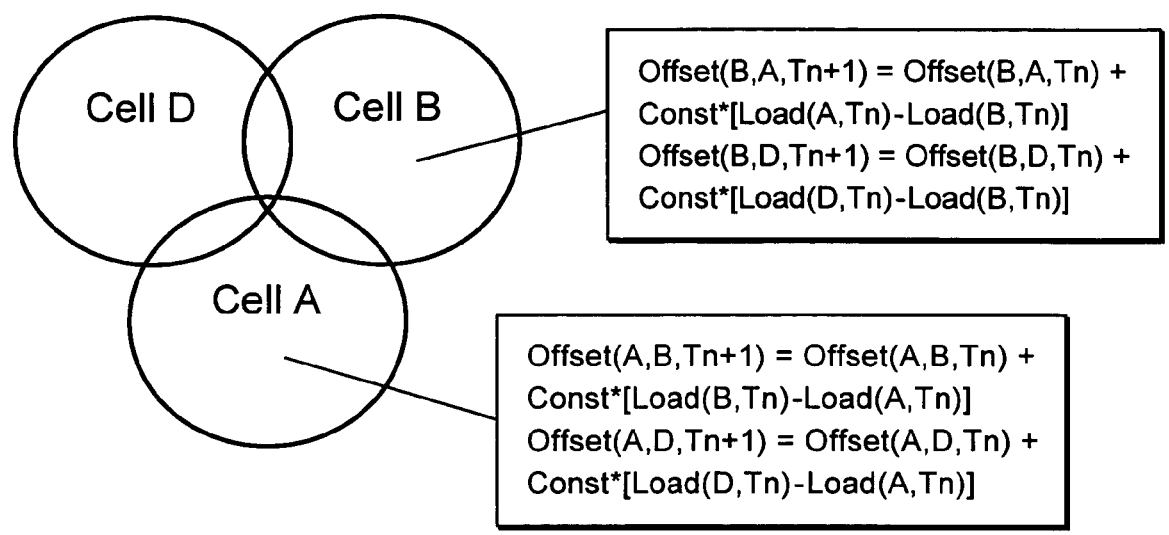
FIG. 5 is a diagram illustrating a broadcast parameter offset adjustment situation.

So the same cell identity will be in different "positions." For example, assume that the identities of two cells are A and B. The offset broadcast in cell A will use 'A' in the source position and 'B' in the neighbor position. The offset broadcast in cell B will use 'B' in the source position and 'A' in the neighbor position. In other words, equations (1)–(3) may be evaluated "simultaneously" in all cells and for each neighbor cell relation. FIG. 5 illustrates the offsets in two cells A and B out of three cells A, B, and D.

The parameter C is a selectable constant. For slower, more gradual adaptation, the value of C should be smaller. Func (X) denotes some function of the input variable X which is chosen to be the difference of loads in two cells in this example. A simple example function is C*X, which reduces equation (2) to equation (1). A more advanced example is $C*X^\alpha$, where $\alpha$ typically is greater than 1. The effect would be larger adjustments for larger load differences. Equations (1)–(2) both set new parameter values (at "time Tn+1") based on the previous ones (at "time Tn"), with an adjustment based on the remaining load difference between the source cell where the parameter is broadcast and each neighbor cell. It is thus a gradual or step-wise adjustment of the parameters for each "time step Tn," where the direction and size depends on the load difference. Although the adjustment may also be based only on the load in the cell itself, it is preferred to base the adjustment on the load difference. But it is also possible to calculate new parameter values independently for each "time step Tn" without considering previous calculations as is done in equation (3).

To calculate the new broadcast parameter in equation (3) the "next value" is set equal to Const0, which is an appropriately configured constant summed with the product of another suitably chosen constant (Const1) and by the measured load difference. Equations (1)–(2) may be preferred when adjustments are frequent, and equations (3) may be used when adjustments are infrequent. Equation (3) typically has a longer load calculation/averaging time similar in length to the time between parameter updates, (i.e., from Tn to Tn+1).

Of course, there are many more possible ways to calculate an offset parameter. Another example is a general low-pass filter type of equation:

$$\text{Offset}(\text{Source, Neighbor}, T_{n+1}) = (1-C) \cdot \text{Offset}(\text{Source, Neighbor}, T_n) + C \cdot [\text{Load}(\text{Neighbor}, T_n) - \text{Load}(\text{Source}, T_n)] \quad (4)$$

A difference between equations (1) and (4) is that the magnitude of the Offset will be limited even if the load difference persists over a long time, which may be a desirable property.

The above examples assume the use of Offset parameters which are broadcast on PBCCH in GSM (GRO) and on BCH in UTRAN (Qoffset1$_{s,n}$ or Qoffset2$_{s,n}$), i.e., with one Offset value for each cell relation. But "pair-wise" offsets may not exist in all cases. For example, in GSM with a conventional broadcast channel (BCCH), there is in each cell only one Offset parameter, CRO, common for all neighbor cells. Hence, the example equations given above would need to be modified.

Idle mobile stations are dynamically steered between cells, either within the same radio access network technology network or in different radio access technology networks, based on load. This provides a number of benefits: network operator flexibility, optimized network resources, reduced overload situations, assurance of satisfactory delivery of subscribed quality of service, and minimized need to perform handover of active connections for load balancing purposes.

While the invention has been described in connection with one or more example embodiments, it is to be understood that the invention is not to be limited to any disclosed embodiment, but on the contrary, is intended to cover various modifications and equivalent arrangements included within the scope of the appended claims.

The invention claimed is:

1. A method for distributing mobile stations between load monitoring areas, where the mobile stations are in a state where each mobile station selects a cell to receive service based on one or more parameters provided by one or both of a first broadcast message in a cell in a first load monitoring area or a second broadcast message in a cell in a second load monitoring area, comprising:

determining a load of the first load monitoring area where the mobile stations are currently camped, and to reduce the load in the first load monitoring area, instructing adjustment of one or more parameters in one or both of the broadcast messages in order to steer one or more of the mobile stations to camp on the second load monitoring area, wherein the one or more parameters includes an offset parameter determined based on a difference between the loads in the first load monitoring area and the second load monitoring area, wherein the offset parameter is added to or subtracted from a signal measurement made by the mobile station for a cell selection procedure or cell re-selection procedure so that by adjusting the offset parameter, one or more of the mobile stations is steered away from the first load monitoring area and steered to camp on the second load monitoring area, and wherein the offset is determined in accordance with one of the following equations (1)–(4):

$$\text{Offset}(\text{Source, Neighbor}, T_{n+1}) = \text{Offset}(\text{Source, Neighbor}, T_n) + C \cdot [\text{Load}(\text{Neighbor}, T_n) - \text{Load}(\text{Source}, T_n)] \quad (1)$$

$$\text{Offset}(\text{Source, Neighbor}, T_{n+1}) = \text{Offset}(\text{Source, Neighbor}, T_n) + \text{Func}[\text{Load}(\text{Neighbor}, T_n) - \text{Load}(\text{Source}, T_n)] \quad (2)$$

$$\text{Offset(Source, Neighbor, } T_{n+})=\text{Const}_0+\text{Const}_1 \cdot [\text{Load(Neighbor, } T_n)-\text{Load(Source, } T_n)] \quad (3)$$

$$\text{Offset(Source, Neighbor, } T_{n+1})=(1-C)\cdot\text{Offset(Source, Neighbor, } T_n)+C\cdot[\text{Load(Neighbor, } T_n)-\text{Load(Source, } T_n)] \quad (4)$$

wherein $T_n$ means "at the nth event," n is a count used during offset calculation, source refers to an identity for a source load monitoring area on which the mobile station currently camps, and neighbor refers to an identity for a neighbor load monitoring adjacent to the source load monitoring area, $\text{Const}_0$, $\text{Const}_1$, and C are constants.

2. The method in claim 1, wherein the first and second load monitoring areas are cells, location areas, routing areas, or service areas.

3. The method in claim 1, wherein the first mobile communications network employs a first radio access technology and the second mobile communications network employs a second different radio access technology.

4. The method in claim 1, wherein the first mobile communications network is a second generation based network and the second mobile communications network is a third generation based network.

5. The method in claim 1, wherein the adjustment instruction is based on an exchange of load information between a first radio access network node in the first mobile communications network and a second radio access network node in the second mobile communications network.

6. The method in claim 1, wherein the adjustment instruction is based on load information from a core network node or a central server.

7. The method in claim 1, further comprising:
controlling a rate of change at which the broadcast message is updated.

8. The method in claim 1, wherein the mobile stations are in one of the following states: an idle state, a ready state, a standby state, a CELL_FACH state, a CELL_PCH state, and a URA_PCH state.

9. Apparatus for distributing mobile stations between different load monitoring areas, where the mobile stations are in a state where each mobile station selects a cell to receive service based on one or more parameters provided by one or both of a first broadcast signal in a first cell or a second broadcast signal in a second cell, comprising electronic circuitry configured to:
determine a load of the first loading monitoring area where the mobile stations are currently camped, and
instruct an adjustment of one or more parameters in one or both of the broadcast messages in order to steer one or more of the mobile stations to camp on the second loading monitoring area in order to reduce the load in the first loading monitoring area,
wherein the one or more parameters includes an offset parameter determined based on a difference between the loads in the first load monitoring area and the second load monitoring area,
wherein the one or more parameters includes an offset parameter addable to or subtractable from a signal measurement made by the mobile station for a cell selection procedure or cell re-selection procedure such that the adjustment of the offset parameter steers one or more of the mobile stations away from the first load monitoring area to camp on the second load monitoring area, and
wherein the electronic circuitry is configured to determine the offset in accordance with one of the following equations (1)–(4):

$$\text{Offset(Source, Neighbor, } T_{n+1})=\text{Offset(Source, Neighbor, } T_n)+C\cdot[\text{Load(Neighbor, } T_n)-\text{Load(Source, } T_n)] \quad (1)$$

$$\text{Offset(Source, Neighbor, } T_{n+1})=\text{Offset(Source, Neighbor, } T_n)+\text{Func}[\text{Load(Neighbor, } T_n)-\text{Load(Source, } T_n)] \quad (2)$$

$$\text{Offset(Source, Neighbor, } T_{n+1})=\text{Const}_0+\text{Const}_1(\text{Load(Neighbor, } T_n)-\text{Load(Source, } T_n)) \quad (3)$$

$$\text{Offset(Source, Neighbor, } T_{n+1})=(1-C)\cdot\text{Offset(Source, Neighbor, } T_n)+C\cdot[\text{Load(Neighbor, } T_n)-\text{Load(Source, } T_n)] \quad (4)$$

wherein $T_n$ means "at the nth event," n is a count used during offset calculation, source refers to an identity for a source load monitoring area on which the mobile station currently camps, and neighbor refers to an identity for a neighbor load monitoring adjacent to the source load monitoring area, $\text{Const}_0$, $\text{Const}_1$, and C are constants.

10. The apparatus in claim 9, wherein the first and second load monitoring areas are cells, location areas, routing areas, or service areas.

11. The apparatus in claim 9, wherein the first load monitoring area is associated with a first mobile communications network that offers a first set of services and the second load monitoring area is associated with a second mobile communications network that offers a second set of services.

12. The apparatus in claim 9, wherein the first mobile communications network employs a first radio access technology and the second mobile communications network employs a second different radio access technology.

13. The apparatus in claim 9, wherein the first mobile communications network is a second generation based network and the second mobile communications network is a third generation based network.

14. The apparatus in claim 13, wherein the first and second set of services are different.

15. The apparatus in claim 9, wherein the adjustment instruction is based on an exchange of load information between a first radio access network node in the first mobile communications network and a second radio access network node in the second mobile communications network.

16. The apparatus in claim 9, wherein the adjustment instruction is based on load information from a core network node or a central server.

17. The apparatus in claim 9, wherein the electronic circuitry is further configured to control a rate of change at which the broadcast message is updated.

18. The apparatus in claim 9, wherein the mobile stations are in one of the following states: an idle state, a ready state, a standby state, a CELL_FACH state, a CELL_PCH state, and a URA_PCH state.

* * * * *

UNITED STATES PATENT AND TRADEMARK OFFICE
CERTIFICATE OF CORRECTION

PATENT NO. : 7,187,934 B2
APPLICATION NO. : 11/010565
DATED : March 6, 2007
INVENTOR(S) : Turina et al.

It is certified that error appears in the above-identified patent and that said Letters Patent is hereby corrected as shown below:

In Column 7, Line 10, in Equation (2), delete "$T_n+1$" and insert -- $T_{n+1}$ --, therefor.

In Column 7, Line 14, in Equation (3), delete "(Load" and insert -- | Load --, therefor.

In Column 9, Line 1, in Claim 1, in Equation (3), delete "$T_{n+}$" and insert -- $T_{n+1}$ --, therefor.

In Column 9, Line 1, in Claim 1, in Equation (3), delete "(Load" and insert -- | Load --, therefor.

In Column 10, Line 14, in Claim 9, in Equation (3), delete "(Load" and insert -- | Load --.

Signed and Sealed this

Eighth Day of April, 2008

JON W. DUDAS
*Director of the United States Patent and Trademark Office*